United States Patent
Lee

(10) Patent No.: US 11,197,128 B2
(45) Date of Patent: Dec. 7, 2021

(54) SYSTEM FOR TRANSMITTING CONTROL SIGNALS USING AN UPLINK

(71) Applicant: Electronics and Telecommunications Research Institute, Daejeon (KR)

(72) Inventor: Kook Jin Lee, Seoul (KR)

(73) Assignee: Electronics and Telecommunications Research Institute, Daejeon-si (KR)

(*) Notice: Subject to any disclaimer, the term of this patent is extended or adjusted under 35 U.S.C. 154(b) by 0 days.

(21) Appl. No.: 13/705,805

(22) Filed: Dec. 5, 2012

(65) Prior Publication Data

US 2013/0094428 A1 Apr. 18, 2013

Related U.S. Application Data

(63) Continuation of application No. PCT/KR2011/005513, filed on Jul. 26, 2011.

(30) Foreign Application Priority Data

| Jul. 26, 2010 | (KR) | 10-2010-0071783 |
| Aug. 5, 2010 | (KR) | 10-2010-0075488 |
| Sep. 14, 2010 | (KR) | 10-2010-0089938 |
| Sep. 30, 2010 | (KR) | 10-2010-0094909 |

(51) Int. Cl.
| *H04W 4/06* | (2009.01) |
| *H04L 12/18* | (2006.01) |
| *H04L 29/06* | (2006.01) |
| *H04L 12/58* | (2006.01) |
| *H04W 76/40* | (2018.01) |

(52) U.S. Cl.
CPC ............ *H04W 4/06* (2013.01); *H04L 12/189* (2013.01); *H04L 51/38* (2013.01); *H04L 65/1066* (2013.01); *H04L 65/4076* (2013.01); *H04W 76/40* (2018.02)

(58) Field of Classification Search
CPC ................................ H04W 4/06; H04L 12/189
USPC ........ 370/312, 432, 349, 336, 315, 430, 341
See application file for complete search history.

(56) References Cited

U.S. PATENT DOCUMENTS

| 7,477,619 B2* | 1/2009 | Lee et al. ...................... 370/328 |
| 8,149,793 B2* | 4/2012 | Baker et al. .................. 370/336 |
| 8,291,457 B2* | 10/2012 | Laksono ............. H04L 12/2805 |
| | | 725/120 |

(Continued)

FOREIGN PATENT DOCUMENTS

| CN | 1943164 | 4/2007 |
| KR | 1020070121515 | 12/2007 |
| WO | 2012/015228 A2 | 2/2012 |

OTHER PUBLICATIONS

International Search Report and Written Opinion for Application No. PCT/KR2011/005513, 6 pages, dated Feb. 6, 2012.

(Continued)

*Primary Examiner* — Rasheed Gidado

(57) ABSTRACT

The present invention relates to a system for providing multimedia service, comprising a network device which provides multimedia services using a wireless network, and a terminal which receives the multimedia services from the network device. The network device may receive feedback on the multimedia service receiving state from the terminal that receives the multimedia services, and control the multimedia services based on the received feedback.

22 Claims, 10 Drawing Sheets

(56) References Cited

U.S. PATENT DOCUMENTS

| | | | | |
|---|---|---|---|---|
| 8,310,919 | B2* | 11/2012 | Worrall | H04W 72/005 370/229 |
| 8,472,364 | B2* | 6/2013 | Hu | H04W 72/005 370/312 |
| 8,521,196 | B2* | 8/2013 | Wang | H04L 12/189 455/414.2 |
| 8,532,683 | B2* | 9/2013 | Koskinen | H04W 72/005 455/3.01 |
| 8,638,715 | B2* | 1/2014 | Nader | H04W 72/005 370/328 |
| 9,084,224 | B2* | 7/2015 | Wang | H04W 72/005 |
| 2003/0119452 | A1* | 6/2003 | Kim | H04W 52/143 455/69 |
| 2003/0220127 | A1* | 11/2003 | Hayashi | H04W 16/28 455/562.1 |
| 2003/0225845 | A1* | 12/2003 | Hong | H04L 12/18 709/206 |
| 2004/0137885 | A1* | 7/2004 | Sarkkinen et al. | 455/414.1 |
| 2004/0146041 | A1* | 7/2004 | Lee et al. | 370/349 |
| 2004/0151133 | A1* | 8/2004 | Yi et al. | 370/312 |
| 2004/0185837 | A1* | 9/2004 | Kim | H04H 60/91 455/414.3 |
| 2005/0036455 | A1* | 2/2005 | Bakker | H04L 12/189 370/312 |
| 2005/0281209 | A1* | 12/2005 | Cai | H04W 74/00 370/270 |
| 2005/0286483 | A1* | 12/2005 | Lee | H04W 72/005 370/345 |
| 2006/0040655 | A1* | 2/2006 | Kim | H04W 76/40 455/426.1 |
| 2006/0067361 | A1* | 3/2006 | Lee | H04W 72/005 370/466 |
| 2007/0165551 | A1* | 7/2007 | Proctor | H04L 29/06 370/312 |
| 2008/0165717 | A1* | 7/2008 | Chen | H04W 72/005 370/312 |
| 2008/0261531 | A1* | 10/2008 | Huang et al. | 455/63.1 |
| 2008/0311892 | A1* | 12/2008 | Lee | H04W 72/005 455/414.1 |
| 2009/0286468 | A1 | 11/2009 | Kim et al. | |
| 2010/0027541 | A1* | 2/2010 | Eriksson | H04W 72/005 370/390 |
| 2010/0067405 | A1* | 3/2010 | Kanazawa | H04W 4/06 370/254 |
| 2010/0110879 | A1* | 5/2010 | Kim | H04L 1/1685 370/216 |
| 2010/0197265 | A1* | 8/2010 | Dorenbosch | H04L 65/4061 455/404.1 |
| 2010/0226263 | A1 | 9/2010 | Chun et al. | |
| 2011/0077006 | A1* | 3/2011 | Hsu | H04W 36/0007 455/436 |
| 2011/0116433 | A1* | 5/2011 | Dorenbosch | 370/312 |
| 2011/0305183 | A1* | 12/2011 | Hsu | H04W 72/005 370/312 |
| 2012/0026929 | A1* | 2/2012 | Wang et al. | 370/312 |

OTHER PUBLICATIONS

Huawei, "MBMS reception status reporting," 3GPP TSG-RAN WG2 Meeting #70bis, R2-103978, 5 pages (2010).

* cited by examiner

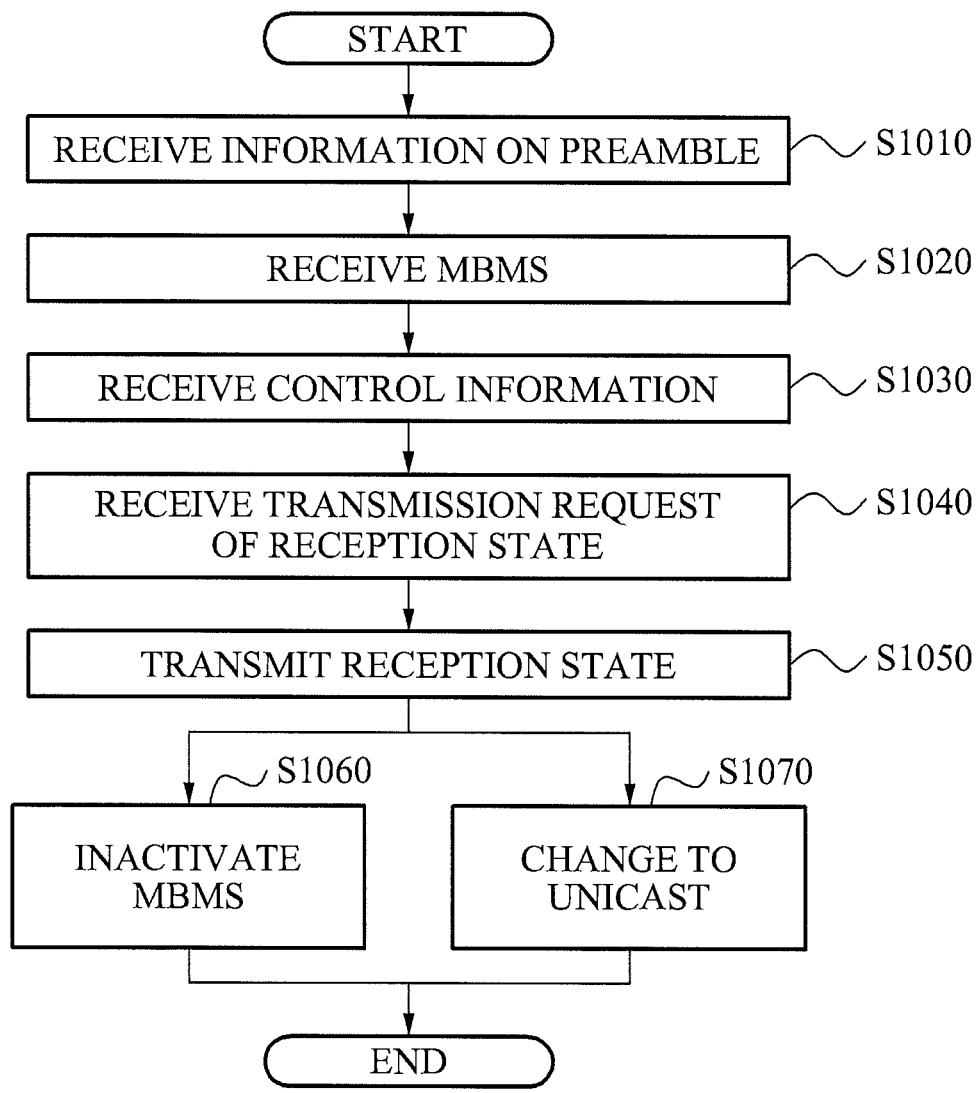

SYSTEM FOR TRANSMITTING CONTROL SIGNALS USING AN UPLINK

RELATED APPLICATIONS

This application is a continuation of PCT application No. PCT/KR2011/005513 filed on Jul. 26, 2011, which claims priority to, and the benefit of, Korean patent application No. 10-2010-0071783 filed on Jul. 26, 2010, Korean patent application No. 10-2010-0075488 filed on Aug. 5, 2010, Korean patent application No. 10-2010-0089938 filed on Sep. 14, 2010, and Korean patent application No. 10-2010-0094909 filed on Sep. 30, 2010. The content of the aforementioned applications is incorporated by reference.

BACKGROUND

Following embodiments relate to a control signal transmission method, and more particularly, to a method for transmitting a control signal using an uplink and a system performing the method.

A multimedia broadcast multicast service (MBMS) is a next-generation mobile television (TV) capable of transmitting broadcasting using a communication frequency band and a mobile communication network.

However, the MBMS in a wireless network is incapable of receiving uplink control information of a terminal. Therefore, the MBMS is incapable of managing wireless resources using the wireless network efficiently or providing a data service optimized for a multimedia service. The MBMS, represented by a broadcasting and multicast multimedia service in a $3^{rd}$ generation partnership project (3GPP) long term evolution (LTE) network, provides only downlink control information for receiving multimedia data between a base station and a terminal.

SUMMARY

An aspect of the present invention provides a method and apparatus for transmitting control information necessary to provide a service, using an uplink.

Another aspect of the present invention provides a transmitting and receiving method and process for exchange of control information.

According to an aspect of the present invention, there is provided an operation method of a network device, the method including receiving, from at least one terminal receiving a multimedia broadcast multicast service (MBMS), a reception state of the at least one terminal with respect to the MBMS; and inactivating the MBMS based on a number of terminals receiving the reception state, or transmitting the MBMS to the at least one terminal by changing a transmission mode to a unicast mode.

According to an aspect of the present invention, there is provided an operation method of a terminal, the method including receiving a multimedia broadcast multicast service (MBMS) from a network device; and transmitting a reception state with respect to the MBMS to the network device.

According to an aspect of the present invention, there is provided an operation method of a terminal, including receiving a multimedia broadcast multicast service (MBMS) from a network device; transmitting a reception state with respect to the MBMS to the network device; and inactivating the MBMS based on the reception state or receiving the MBMS by changing a transmission mode to a unicast mode.

According to an aspect of the present invention, there is provided a method and apparatus for transmitting control information necessary for providing a service, using an uplink.

According to an aspect of the present invention, there is provided a reception and transmission method and process for exchanging control information.

BRIEF DESCRIPTION OF DRAWINGS

FIG. 10 is a flow chart illustrating stages of an operation method of a terminal, according to another embodiment of the present invention.

DETAILED DESCRIPTION

Figure 1:
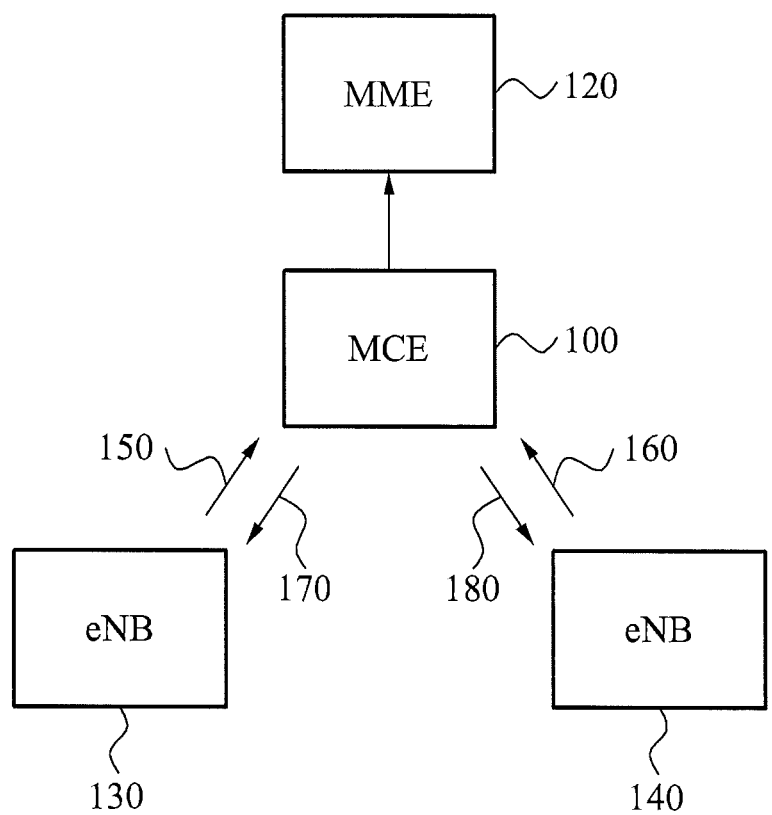
FIG. 1 is a diagram illustrating network entities related to a multimedia service, an interface among the entities, and a process of exchanging control information.

FIG. 1 is a diagram illustrating network entities related to a multimedia service, an interface among the entities, and a process of exchanging control information.

The network entities include a mobility management entity (MME) 120, a multicell/multicast coordination entity (MCE) 100, and an evolved node-Bs (eNB) 130 and 140. In FIG. 1, the eNBs 130 and 140 belong to the same synchronized transmission area. The eNBs 130 and 140 collect multimedia service reception states of terminals respectively connected to the eNBs 130 and 140, and report the reception state to the MCE 100.

According to an aspect, activation and inactivation of a multimedia service may be determined by the MME 120, media-gateway (M-GW), broadcast multicast-service center (BM-SC), and the like. However, the embodiment shown in FIG. 1 presumes that the activation and inactivation be determined by the MCE 100. The MCE 100 receiving reception state of the terminals respectively belonging to the eNBs 130 and 140 determine activation and inactivation of a particular multimedia service. The MCE 100 may transmit the determination result to the eNBs 130 and 140 and the MME 120 so that the determination result is applied.

According to an aspect, not only terminals connected with a wireless network, that is connected terminals, but also terminals not connected with the wireless network, that is non-connected terminals, may receive the multimedia service from the wireless network. In this case, not only the connected terminals but also the non-connected terminals may feedback a reception state with respect to the multimedia service to the wireless network.

According to an aspect, the network may request the terminals to feedback the reception state with respect to the multimedia service. For example, the network may transmit a control message by multicast or broadcast, or transmit a control message containing a transmission request for the reception state by paging and the like. According to another embodiment, the network may transmit the control message using a physical downlink control channel (PDCCH).

According to an aspect, the connected terminals may conveniently transmit the reception state to the network.

When the non-connected terminals are switched to a connected state, the connected terminals may feedback the reception states thereof to the network. According to an aspect, the non-connected terminals may be connected to the network using a random access process and feedback the reception state to the network.

A terminal may transmit a preamble to a base station using a random access process and, after receiving a response to the preamble from the base station, may transmit control information regarding a multimedia service reception state. The terminal may inform that the terminal receives a corresponding multimedia service, by using its radio network temporary identifier (RNTI), a M-RNT, or an identifier (ID) indicating a particular multimedia, or transmitting a message containing a multimedia reception state. Here, the RNTI refers to an ID for the base station to distinguish a terminal or a terminal group including the terminal in the base station.

According to an aspect, the terminal receiving a particular multimedia service may determine whether to report a reception state regarding the multimedia service.

According to an aspect, prior to performing the random access process, the terminal may receive the control information from the base station and transmit the predetermined preamble or connect at a predetermined time.

According to another aspect, the terminal may transmit preambles allocated for non-contention based random access to the base station. Then, the base station may determine the reception state of the terminal according to whether a preamble received from the terminal is the preamble allocated for non-contention based random access. For example, the base station may be set such that a preamble not used for an original purpose among the preambles allocated for the non-contention based random access is used by multimedia service receiving terminals. In this case, when a terminal exists, which transmits preambles other than the preamble not used for the primary purpose among the allocated preambles, the base station may regard the terminal as the multimedia service receiving terminal. Thus, by transmitting preambles, the base station may determine the reception state of the terminals with respect to the multimedia service in a non-connected state.

When the base station requests transmission of the reception state with respect to the multimedia service using the paging method, the terminal may determine whether to perform the random access process. Here, the base station may transmit information on a preamble to be used by the terminal, an access point in time, a wireless resource used for the access, and the like, using a paging message.

When the terminal in a non-connected state needs to switch to the connected state during reception of the multimedia, the terminal may report a multimedia reception state thereof irrespective of a reason for the switching.

According to a reception state reporting method of the terminal or a requesting method of the network, all terminals in a particular multimedia service area or only selected terminals may transmit the multimedia reception states thereof. For example, randomly selected terminals may report the multimedia reception states or terminals receiving the particular multimedia may report the reception states with respect to a corresponding multimedia service.

A process for the terminal to report the reception state with respect to the multimedia service to the base station may include a method of starting from the terminal and a method of starting from the base station.

1) Method of Starting from the Terminal

The method of starting from the terminal may set the terminal such that the terminal starts connection when a particular condition is satisfied. For example, the terminal may be set to transmit the control information to an uplink with a temporal condition such as periodic transmission or transmission at a particular time. Alternatively, the terminal may be set to transmit the control upon a user operation, for example, when a user of the terminal operates the terminal to receive the multimedia service by inputting a related function key or number, or touching a related icon on a screen, or when the user changes a current receiving channel to another channel. In addition, considering mobility of the terminal, the terminal may be set to transmit the control information to the uplink when the terminal enters a new reception region or to another broadcasting or multicasting multimedia service area.

When the uplink control information is transmitted according to the user operation, the terminal may determine whether to transmit the control information by setting a threshold value. For example, the terminal may transmit the control information when the terminal stays in one broadcasting channel for 2 seconds or longer. Therefore, when a particular parameter exceeds the threshold value, which may be set as a time continuously receiving a corresponding multimedia service channel or received data size, the terminal may report the reception state with respect to the multimedia service to the base station. That is, the terminal transmits the control information to the base station when the terminal needs to report its multimedia reception state, such as when the terminal first starts reception of the multimedia service, when a handover occurs since the terminal enters another base station area or since the terminal has already been receiving another multimedia service, or when a multimedia service area of the terminal is changed.

The terminal needs to receive the control information such as a transmission period, the threshold value, a maximum number of sessions, and the like, from the network to perform the foregoing process. In a long term evolution (LTE) network, the control information may be received through multicast control channel (MCCH) control information, system information such as SIB13, or a newly defined control message.

When a terminal for receiving a particular multimedia service is absent or insufficient, the wireless network may inactivate the multimedia service. When a number of base stations necessary for relay of the multimedia service is insufficient, the wireless network may inactivate the multimedia service. For example, regarding a multimedia broadcast multicast service (MBMS) in a 3rd generation partnership project (3GPP) long term evolution (LTE) network, the multimedia service may be inactivated in units of a multicast broadcast single frequency network (MBSFN) area or in units of a cell. Conversely, when the multimedia service has a large number of users, the multimedia service may be activated to a multicast or broadcast type multimedia.

2) Method of Starting from the Base Station

In a process for the terminal to report the reception state to the base station by starting from the base station, the base station or a control entity related to transmission of the multimedia may transmit control information requesting the terminal to transmit the reception state to the base station. The terminal may receive the control information from the network and, in response, feedback the reception state with respect to the multimedia service to the network. According to an aspect, a network entity may request transmission of the reception state periodically or when a particular condition is satisfied. For example, when an event occurs, such as when inspection of a reception state regarding a particular multimedia service is necessary, the transmission request for the reception state may be transmitted to the terminals.

In the 3 GPP LTE network, the base station may transmit control information, for example, the MCCH control information to the terminal, thereby requesting transmission of the control information to the uplink from the terminal. Here, transmission of control information related to a multimedia service other than the service currently being transmitted may be requested, based on control information of the multimedia service currently being received or the multimedia service belonging to the base station. Object terminals may include all terminals receiving the multimedia, terminals randomly selected from the terminals receiving the multimedia, terminals receiving a particular multimedia, or terminals interested in the multimedia service irrespective of the reception state.

When existing control information such as the MCCH control information is used, a list of unicast multimedia services may also be transmitted along with the multicast or broadcast multimedia service. The control information may indicate whether a current service is the unicast multimedia service. The MCCH control information may include a list of all sessions irrespective of activation or inactivation, and indicate information on the activation or inactivation on a corresponding session list. A terminal to receive an inactivated service may determine whether to broadcast the multimedia service by unicast.

The MCCH information may configure an activated session list and an inactivated session list separately in one control information or as different control information.

Figure 2:
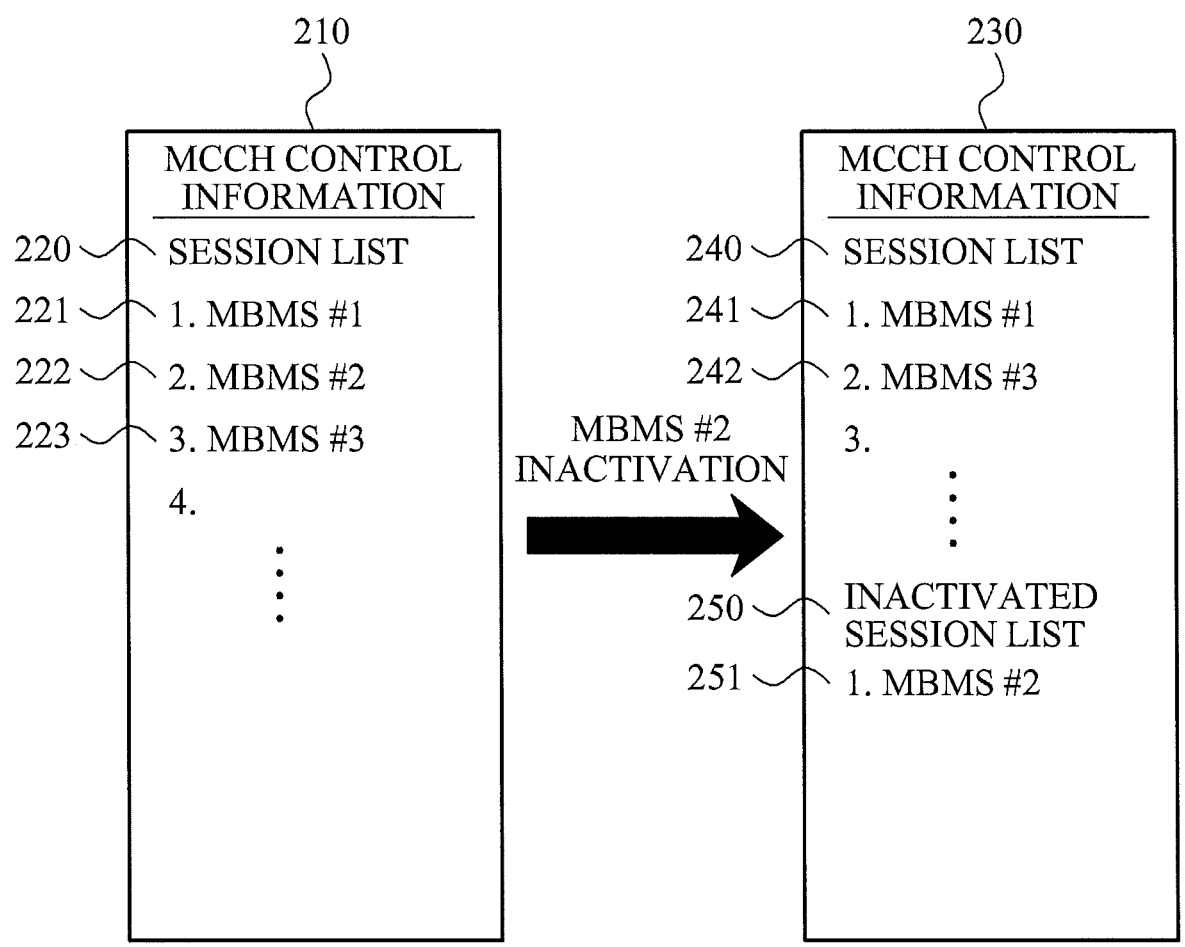
FIG. 2 is a diagram illustrating a structure of a control information transmission channel, according to an embodiment of the present invention.

FIG. 2 is a diagram illustrating a structure of a control information transmission channel according to an embodiment of the present invention.

When a first multimedia service in a session constructing MCCH control information is inactivated, a base station may delete the first multimedia service from an original session list and separately configure an inactivation list. As shown in FIG. 2, when MBMS#2 is inactivated in the session list, the MBMS#2 may be deleted from the session list and managed by being classified as an inactivation session. Alternatively, the base station may transmit a list of activated multimedia services through a physical multicast channel (PMCH)-InfoList. In addition, the base station may define a new information element such as physical downlink shared channel (PDSCH)-Infolist with respect to a list of inactivated multimedia services, and transmit the new information element to the terminal.

Therefore, in a process of transmitting a reception state of a terminal with respect to a multimedia service to receive the multimedia service of the inactivated session, the terminal may transmit the control information preferring reception of a corresponding multimedia service session, or reset a connection state to shift to a connected state or secure a new data transmission path.

When MCCH information is changed, the base station may inform the terminal of a necessity of MCCH reception, through MBMS notification. That is, the base station may inform that a report of the reception state is requested using the MCCH control information through notification to a terminal interested in receiving the MBMS. Here, the base station may transmit different MBMS notification control information to the terminal, according to a reason for the MCCH information change. After the MBMS notification, the terminal may determine whether to receive the MCCH as necessary. The MBMS notification method may be varied according to cases, such as when a new session is started, when the report of the reception state of the terminal is requested, and the like. For example, an RNTI value may be varied according to the MCCH changing reason. A notification transmission position may be varied for discrimination. Alternatively, the terminal may receive PDCCH control information and transmit control information for discriminating a reason for the notification. The network may generate notification by classifying the reasons into a request for reception state information of the terminal for activation and a request for reception state information of the terminal for inactivation. For example, when the network requests transmission of a reception state reporting message to determine a particular service is inactivated, the network may transmit notification information to inform that the MCCH is changed.

The terminal may not be connected with the network even when connection is started from the terminal and when connection is started from the network. In this case, the terminal may connect to the network periodically or when a particular condition is satisfied and report the reception state thereof. When the terminal is connected to the network, the foregoing process is unnecessary.

The control information transmitted by the terminal to the uplink may include a multimedia receiving area ID, a multimedia wireless channel ID, a multimedia session ID, or a combination of the aforementioned IDs. The control information may be omitted according to downlink control information of the network. When the terminal receives the aforementioned control information from the network, the terminal may not report the control information of all the currently received multimedia but may transmit only differential information for discriminating a corresponding multimedia service.

According to an aspect, in the 3 GPP LTE network, the terminal may transmit control information configured by combining an MBSFN area ID, a PMCH ID, a session ID, and the like, to the base station. The terminal may transmit only a differential value for discriminating the control information from a session list of the control information being transmitted to the MCCH.

The terminal may transmit a reception state with respect to at least one multimedia service, to the network. In this case, the base station may add and transmit additional information, such as information on a priority, to a plurality of multimedia services. Alternatively, the base station may perform transmission by classifying the multimedia services into multimedia services strongly requested for watching by the terminal and multimedia services merely preferred or desired by the base station.

The network may collect the reception states of the respective terminals with respect to the multimedia service, and activate or inactivate the particular multimedia service considering the collected reception states. The network may activate or inactivate a multimedia service being transmitted by multicast or broadcast. For example, the network may activate services to be provided afterward, inactivated services, or multimedia services being transmitted by unicast.

The network may manage the multimedia service even when transmitting the multimedia service by unicast, that is, in a point to point (PTP) method. That is, the network may control a session related to the multimedia service being received one to one by a particular terminal, other than a multi broadcasting service. In case of the 3GPP LTE network, the network may form and manage a session list of unicast multimedia services transmitted to a shared channel (PDSCH-DL-SCH). The network entity, for example an eNB, MCE, M-GW, or BM-SC, may manage the session list of the multimedia services being transmitted by unicast. Also, the network entity may manage and control the control information including a session transmission state, reception states of the terminals, or information on terminals receiving a particular session, such as a number of the terminals. For example, when the MCE is managing the control information related to the unicast multimedia service described in the foregoing, the MCE manages multimedia session control information of PTP and point to multipoint (PTM) methods in an MBSFN area related to the corresponding MCE.

The base station may manage session information related to unicast services transmitted by PTP by terminals belonging to the base station, and also manage the reception states of the terminals. The base station may request the terminals for transmission of the reception states of the terminals, perform control according to a radio bearer state internally transmitted, or report the reception states of the terminals to the MCE.

The network entity such as the MCE or M-GW may transmit control information to the base station, the control information for recognizing the unicast multimedia services transmitted from the base station, such as relations between the multimedia session ID and a radio bearer ID. According to an aspect, in the similar manner that the session is managed according to the PMCH, a super type entity may manage the multimedia session information transmitted to the DL-SCH.

The network entity may observe a number of terminals using the PTP service from multimedia transmission related entities, such as the MCE or the base station, using the above-described control information. Alternatively, the network entity may request a report of the reception states from the terminals using the PTP service. According to another embodiment, when a predetermined particular event occurs, the network entity may request a terminal or the network detecting the event to report the reception state.

When the particular multimedia service is inactivated and changed to the unicast mode, the network may control the service such that a plurality of terminals receives the same multimedia service using the PDSCH resource. The network may control the service such that the same multimedia service on the PDSCH is received by different terminals, so as to transmit the particular multimedia service to a plurality of terminals. Here, the plurality of terminals may receive the same PDSCH resource using different RNTI values respectively or using a new RNTI value that can be shared by the plurality of terminals. When the new RNTI value is defined, the terminals may continue receiving the multimedia service even in a non-connected state. To enable the plurality of terminals in the base station to receive the same multimedia service data, the base station may apply a channel setting, such as a modulation coding scheme (MCS) and transmission power, with respect to a terminal having a poorest channel environment.

The network may transmit, to the terminal, control information related to a multimedia service to be provided afterward. In case of the 3 GPP LTE network, the network may transmit, to the terminal, a multimedia service list to be provided afterward or a multimedia service reception state along with the multimedia service list, using the control information such as the MCCH or channel information in an application layer. The base station may determine whether to perform activation afterward in consideration of a request of the terminal for reception of the multimedia service.

According to an aspect, information related to the foregoing services is included in the MCCH information. The network may classify the multimedia service as an inactivated service until the multimedia service is started. The network may inform through MSI information that the multimedia service is not scheduled while including the information related to the multimedia service in the original session list.

Activation and inactivation of the multimedia service are performed at a point in time when reception of the multimedia session control is available. The network may transmit control information such as an MCCH modification period and an MCCH repetition period, and transmit information on the activation and inactivation of the multimedia service to the terminal so that the terminal determines reception of the multimedia service. For example, upon ending of one the MCCH modification periods, the network may start transmission of the multimedia data by a newly applied transmission method. Alternatively, after one MCCH modification period is ended and then an n-number of MCCH repetition periods is transmitted, the network may start transmission of the multimedia data by the newly applied transmission method. Also, the network may use both the new transmission method and a previous transmission method for a predetermined period. When the network connects the control information related to activation and inactivation irrespective of the MCCH modification period and the MCCH repetition period, the terminal receiving the control information may change a reception mode.

For example, when the PTM service is changed to the PTP service or vice versa, the change caused by activation or inactivation may not be applied to all the terminals simultaneously. Each of the terminals may set a time period for converting the reception mode. Specifically, a previously defined time period such as the MCCH repetition period or the MCCH modification period of the LTE network may be used as the time period for changing the reception mode. Also, a newly defined time period may be used as the time period for changing the reception mode. Alternatively, the network may maintain the respective transmission methods until all the terminals successfully change the reception mode.

Figure 3:
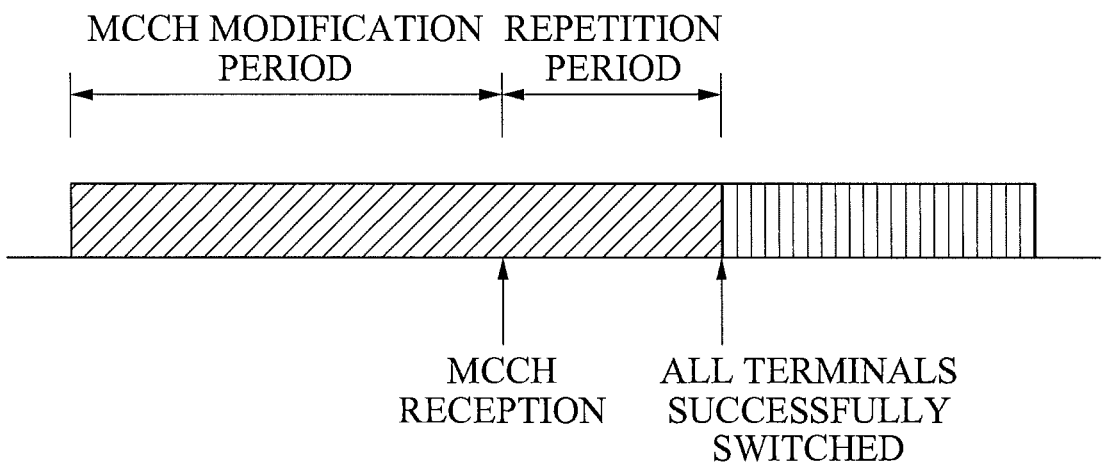
FIG. 3 is a diagram illustrating a switch delay period according to an embodiment of the present invention.

FIG. 3 is a diagram illustrating a switch delay period according to an embodiment of the present invention.

In FIG. 3, a base station transmits control information related to activation and inactivation of multimedia services in an MCCH modification period, to a terminal. The terminal receiving a particular multimedia service by multicast and broadcast changes a transmission mode to the unicast mode. That is, for a time period for the terminals to change a reception mode from PTM to PTP, the base station may provide the same service by two methods for a predetermined period, of which an example is shown in FIG. 3 in the form of one MCCH repletion period. When the network determines activation and inactivation of the multimedia service, a predetermined condition needs to be met. For example, the condition may be met when a number of terminals receiving the particular multimedia service in a particular service area or a number of base stations including the terminals receiving the particular multimedia service in a particular service area exceeds a threshold value. That is, when the number of terminals to receive the multimedia service in one MBSFN area in the 3GPP LTE network reduces to a first threshold value or lower, the network may inactivate the corresponding multimedia service. Conversely, when the number of terminals becomes a threshold value or greater, the network may activate the corresponding multimedia service.

The threshold value for activation and the threshold value for inactivation may be set to be equal or different. In the latter, the network may set the threshold value for activation to be higher than the threshold value for inactivation. When counting the number of base stations including the terminals currently receiving, the network may inactivate a particular multimedia service when the particular multimedia service is received in a particular number of base stations or less, or activate the multimedia service in the contrasting case. In addition, the base station may collect reception states of terminals for a predetermined time and determine activation and inactivation of the multimedia service based on the reception states. Therefore, the network may determine activation and inactivation of the multimedia service considering the above conditions individually or collectively. For example, the network may determine activation and inactivation of the multimedia service after collecting the reception state only once, or after receiving the reception states for a predetermined period or by a predetermined number of times or greater and performing statistical calculation.

The base station may receive the reception states of the terminals belonging to the base station with respect to the multimedia service. The base station may generate control information based on the reception states of the terminals, and transmit the control information to an entity that controls the multimedia service. The multimedia service control entity may determine whether to inactivate the particular multimedia service based on the control information. When there is a multimedia service to be inactivated, the multimedia service control entity may transmit the control information to the base station and an entity that transmits multimedia service data, thereby inactivating the corresponding multimedia service. Here, transmission may be performed by unicast.

Figure 4:
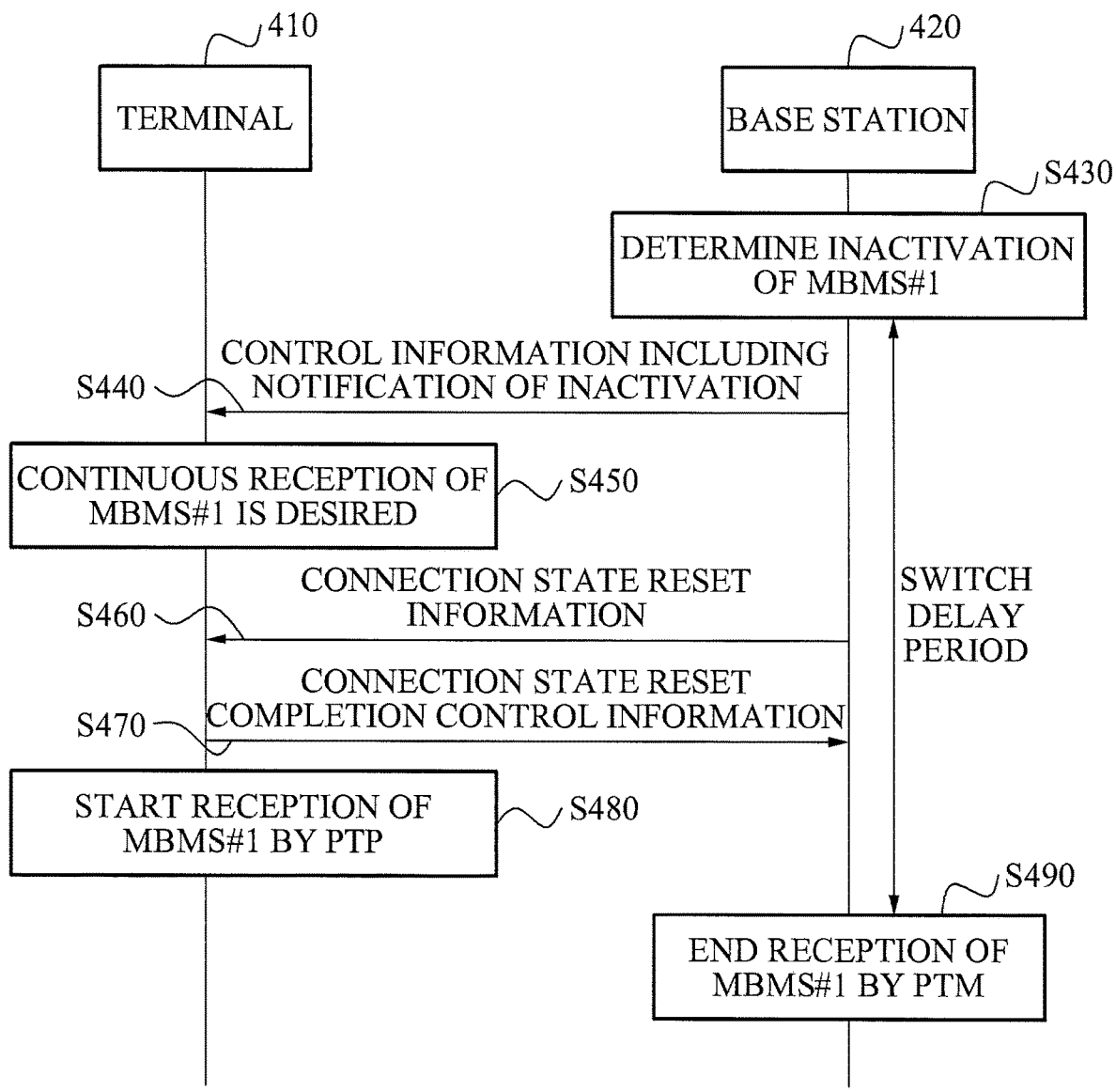
FIG. 4 is a diagram illustrating an inactivating process with respect to connected terminals, according to an embodiment of the present invention.

FIG. 4 is a diagram illustrating an inactivating process with respect to connected terminals 410, according to an embodiment of the present invention.

In operation S430, a base station 420 determines to inactivate a first multimedia service MBMS #1.

In operation S440, the connected terminal 410 may receive control information containing information indicating inactivation of the first multimedia service, from the base station 420. Here, for transmission of the control information, the base station 420 may use control information such as conventional MCCH, user information such as MSI, or a newly defined message. The base station 420 may not directly transmit the control information but transmit a control message for resetting a data path in a connected state along with information on the inactivation of the multimedia service or control information only for resetting the data path without the information on the inactivation.

When the terminal desires to continuously receive the first multimedia service in operation S450, the base station 420 may transmit a connection state reset information to the terminal 410 in operation S460.

The terminal 410 may receive the first multimedia service by the PTP mode from operation S480.

In operation S490, the base station 420 may end transmission of the first multimedia service of the PTM mode. Accordingly, the terminal 410 may receive the multimedia service by changing the transmission mode from the PTM to the PTP from a point of time when reset of the data path is completed. The base station 420 may transmit the multimedia service using two methods, one of which is unicast and the other is multicast with broadcast, until all terminals receiving the previous multimedia service are connected with the network or for a predetermined period.

Figure 5:
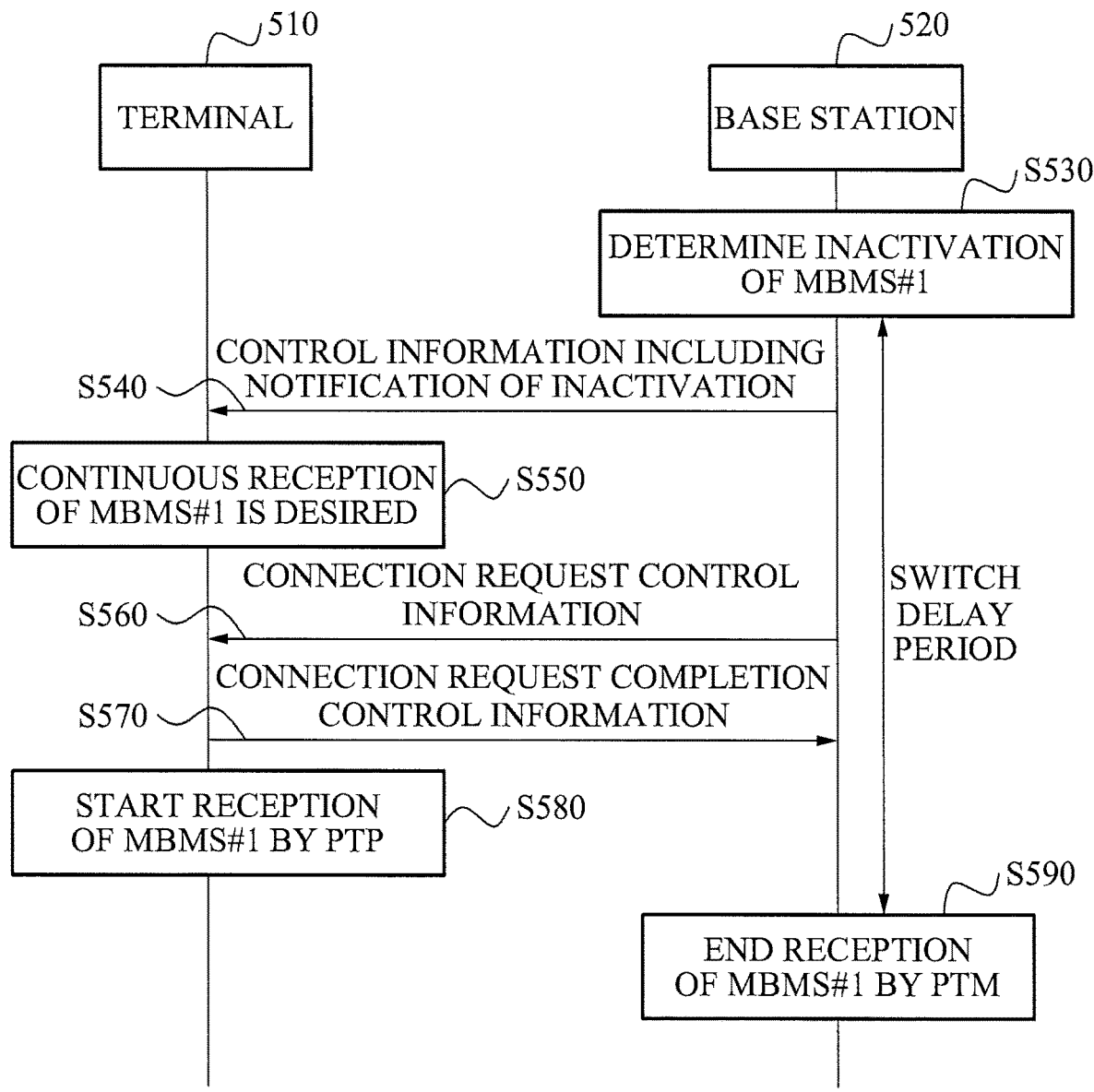
FIG. 5 is a diagram illustrating an inactivating process with respect to non-connected terminals, according to an embodiment of the present invention.

FIG. 5 is a diagram illustrating an inactivating process with respect to non-connected terminals, according to an embodiment of the present invention.

In operation S530, a base station 520 determines to inactivate a first multimedia service considering a multimedia reception state collected from a terminal 510.

Here, the base station 520 is presumed to collect multimedia reception states of connected terminals first. The base station 520 may determine activation and inactivation of a particular multimedia service using corresponding information. Prior to determining activation and inactivation, the base station 520 may transmit control information related to the activation and inactivation to the non-connected terminals. The non-connected terminals receiving the control information may determine whether to continue receiving the multimedia. When the multimedia service is inactivated, the non-connected terminals may transmit their multimedia service reception states. The network may determine activation and inactivation in consideration of the multimedia service reception states of the non-connected terminals and reception states of the connected terminals.

In operation S540, the base station 520 may transmit the control information related to the activation and inactivation to the terminal 510. The control information may include any of MCCH control information, MSI, system information, and a paging message.

Receiving the control information, the terminal 510 which is non-connected is shifted to a connected state in operation S550 and determines whether to continue receiving the multimedia service. When the terminal 510 determines to continuously receive the multimedia service, the terminal 510 may normally be connected to the network through a random access process and receive the multimedia by unicast.

When the particular multimedia service, such as a multimedia service being currently watched, is inactivated and needs to be changed from multicast and broadcast to unicast, the terminal 510 may determine whether to maintain the same channel. Here, according to a setting of the network, the terminal 510 may select whether to receive the same level of data in terms of image quality, resolution, frames per second, and the like, or a lower level of data than the previous multimedia data, using the same channel. Also, according to setting of the network, the terminal 510 may receive the same level of data or a lower level of data with reference to the previously received multimedia service. When multicast and broadcast are changed to unicast, cost for receiving the multimedia service may be changed.

When the terminal 510 determines to continuously receive a first multimedia service, the terminal 510 may transmit connection request control information to the base station 520 in operation S560. In operation S570, the terminal 510 may receive connection request completion control information from the base station 520.

The terminal 510 may receive the first multimedia service by a PTP mode from operation S580, and end transmission of the first multimedia service of a PTM mode in operation S590. That is, the terminal 520 may transmit the multimedia service by two methods, one of which is unicast and the other is multicast with broadcast, until all terminals receiving the previous multimedia service are connected with the network or for a predetermined period.

Figure 6:
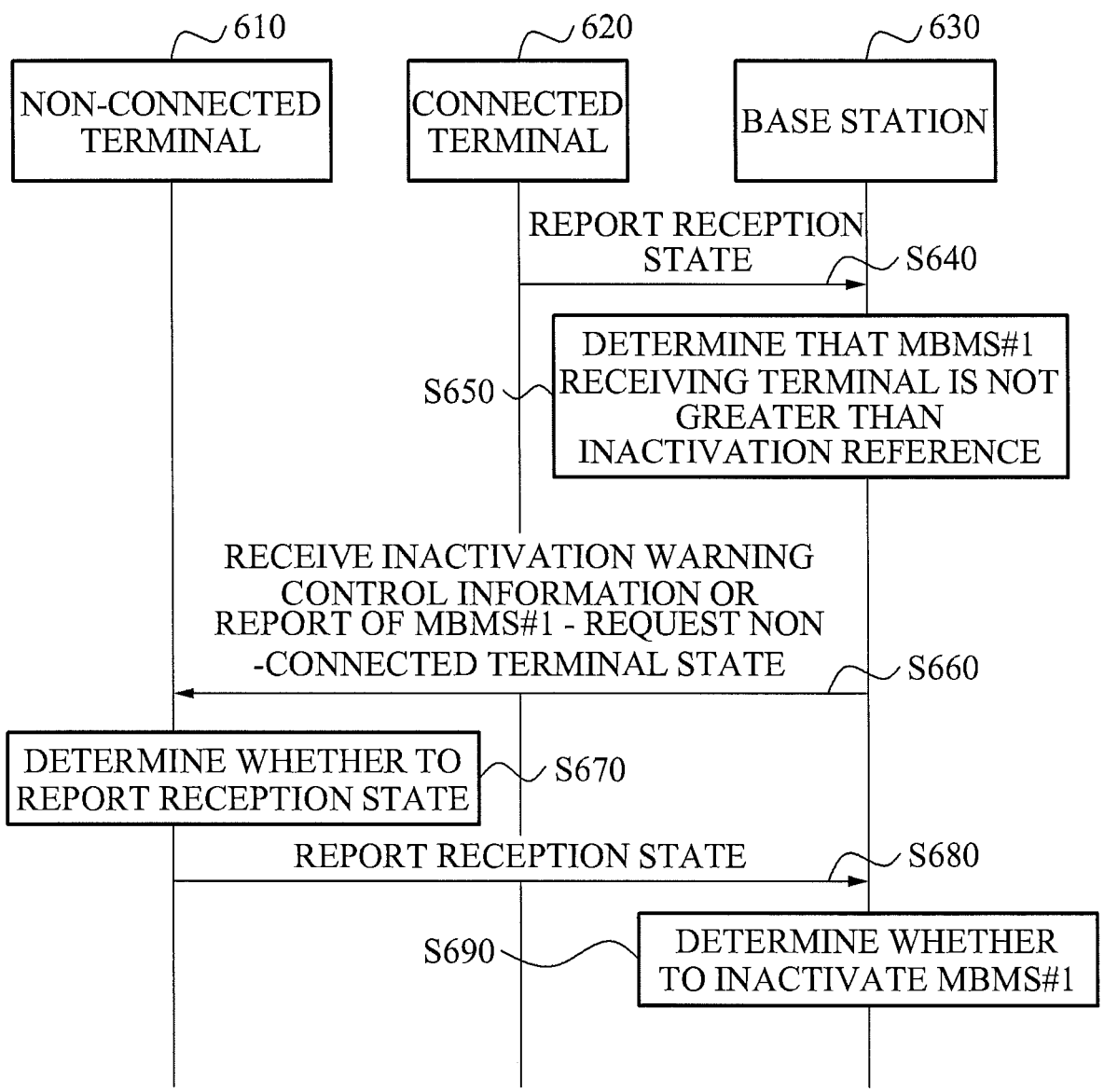
FIG. 6 is a diagram illustrating a case where reception states of connected terminals are collected first and data is further collected from non-connected terminals, according to an embodiment of the present invention.

FIG. 6 is a diagram illustrating a case where reception states of connected terminals are collected first and data is further collected from non-connected terminals, according to an embodiment of the present invention.

In operation S640, a base station 630 may collect reception states of the connected terminals with respect to a first multimedia service, and determine whether conditions of activation and inactivation of the first multimedia service are satisfied. In addition, in operation S650, the base station 630 may determine activation and inactivation according to the whether the conditions are satisfied.

In operation S660, the base station 630 may transmit a notification or a warning message related to activation and inactivation of the first multimedia service, to a terminal 610 by multicast and broadcast or by unicast. When the terminal 610 is in a non-connected state, the terminal 610 may receive the message in operation S660 and determine whether to transmit a reception state with respect to the multimedia service in operation S670.

In operation S680, the terminal 610 may transmit the reception state with respect to the multimedia service to the base station 630. The base station 630 may receive the corresponding information, and determine whether to finally activate or inactivate the multimedia service in operation S690.

When a particular MBMS is inactivated in a 3 GPP LTE network, the base station 630 may transmit whether the multimedia service is activated to the terminal 610, using existing control information such as MCCH control information or MCH scheduling information. The base station 630 may delete control information related to a corresponding MBMS from MCCH session information, notify that the MBMS is inactivated in the MCCH session information, or indicate that a corresponding service is not supported in MCH scheduling information. For example, when activation and inactivation of a particular multimedia service are notified through the MCCH session information, the base station 630 may configure bitmap-type control information according to whether the multimedia service is activated or inactivated. That is, in the MCCH information, the base station 630 may newly define control information indicating activation and inactivation in addition to session related control information in a pmch-Infolist information element which is an information element containing the session list. Alternatively, in the MCCH control information, the base station 630 may separately form bitmaps containing information on activation and inactivation in order of the session list contained in the pmch-Infolist information element. When the base station 630 uses the MCH scheduling information, the base station 630 may inform the terminal 610 of a multimedia service not transmitted in a scheduling period including the MCH scheduling information. When the control information simply indicates absence of a particular MBMS in particular MCH scheduling information, the base station 630 may add, to the MCH scheduling information, control information indicating whether the MBMS is inactivated. The base station 630 may indicate absence of the corresponding multimedia service using a particular value defined by the MCH scheduling information using a conventional method, or delete the multimedia service from the MCH scheduling information. When the base station 630 defines a new control message, the control information indicating inactivation of the multimedia service may be transmitted to the terminal 610 receiving the inactivated multimedia service one by one, by multicast, or by broadcast.

When the particular multimedia service is inactivated, a wireless network may transmit relevant control information to a downlink. In the 3GPP LTE network, the control information may be transmitted through a control plane or a user plane. When transmitting the control information related to inactivation of the multimedia service through the user plane, the base station 630 may transmit the control information related to inactivation of a particular multimedia service using the MCH scheduling information. In this case, the base station 630 may transmit the control information to the terminal 610 using a LCID value not used for transmission of the multimedia. When the base station 630 transmits the control information using the control plane, the base station 630 may include information indicating inactivation in the MCCH control information or delete the information from the session list. In another manner, the base station 630 may indicate inactivation of the multimedia service in an application layer.

The network entity such as an MCE may transmit not only a session end notifying message but also a control message related to activation and inactivation, to the base station 630 or another network entity. For example, after determining inactivation, the MCE may transmit control information related to the inactivation to the base station 630 or network entities such as BM-SC or MME. The base station 630 or the network entities receiving the control information may perform a process related to inactivation afterward.

The base station 630 considers a number of terminals receiving unicast multimedia service in the base station 630 or considers a number of terminals interested in a multimedia service transmitted not by multicast or broadcast. When the number exceeds a predetermined value, the base station 630 may change the multimedia service to a multicast and broadcast multimedia service. The base station 630 may determine the number of the terminals receiving the unicast multimedia service, using control information received from a super type entity related to the multimedia service or an ID such as a radio bearer. In another manner, the base station 630 may determine the number of the terminals by transmitting, to the terminal, control information causing the terminal to report the reception state of the terminal.

When the multimedia service being received is changed to multicast or broadcast multimedia service, the base station may receive the multicast or broadcast multimedia service in a connected state or a non-connected state. The network transmits a control message to inform the terminal about the change of the multimedia service. The terminal receiving the control message may receive the control information of the multicast and broadcast service, thereby continuously receiving a desired multimedia service. The network may transmit the control message to inform the terminal that the transmission path using the unicast mode is changed to use multicast and broadcast.

In the 3 GPP LTE network, the network may notify the terminal that the previously received multimedia service is activated, using newly defined control information or existing control information. The terminal may receive the MCCH control information and thereby continuously receive the previously received multimedia service. In this case, the network may simply inform the terminal that the multimedia service is activated, so that the terminal receives MBMS related control information such as MCCH notification. The network may add the MBMS related control information to the control information transmitted to the terminal, so that the terminal is quickly switched. For example, the network may transmit a message informing the terminal about activation of the multimedia service while also transmitting information necessary for receiving the MBMS, the information such as MBSFN subframe set, M-RNTI or MBMS related system information, or MCCH position information.

According to another aspect, the network may transmit a RRCConnectionReconfiguration message. Terminals receiving the RRCConnectionReconfiguration message may continue reception of the multimedia service by newly setting the radio bearer. Alternatively, the network may not notify activation and inactivation of the multimedia service. In this case, the terminal may receive the MCCH information or the network may transmit the RRCConnectionReconfiguration message so that the terminal receives the multicast and broadcast multimedia service.

Figure 7:
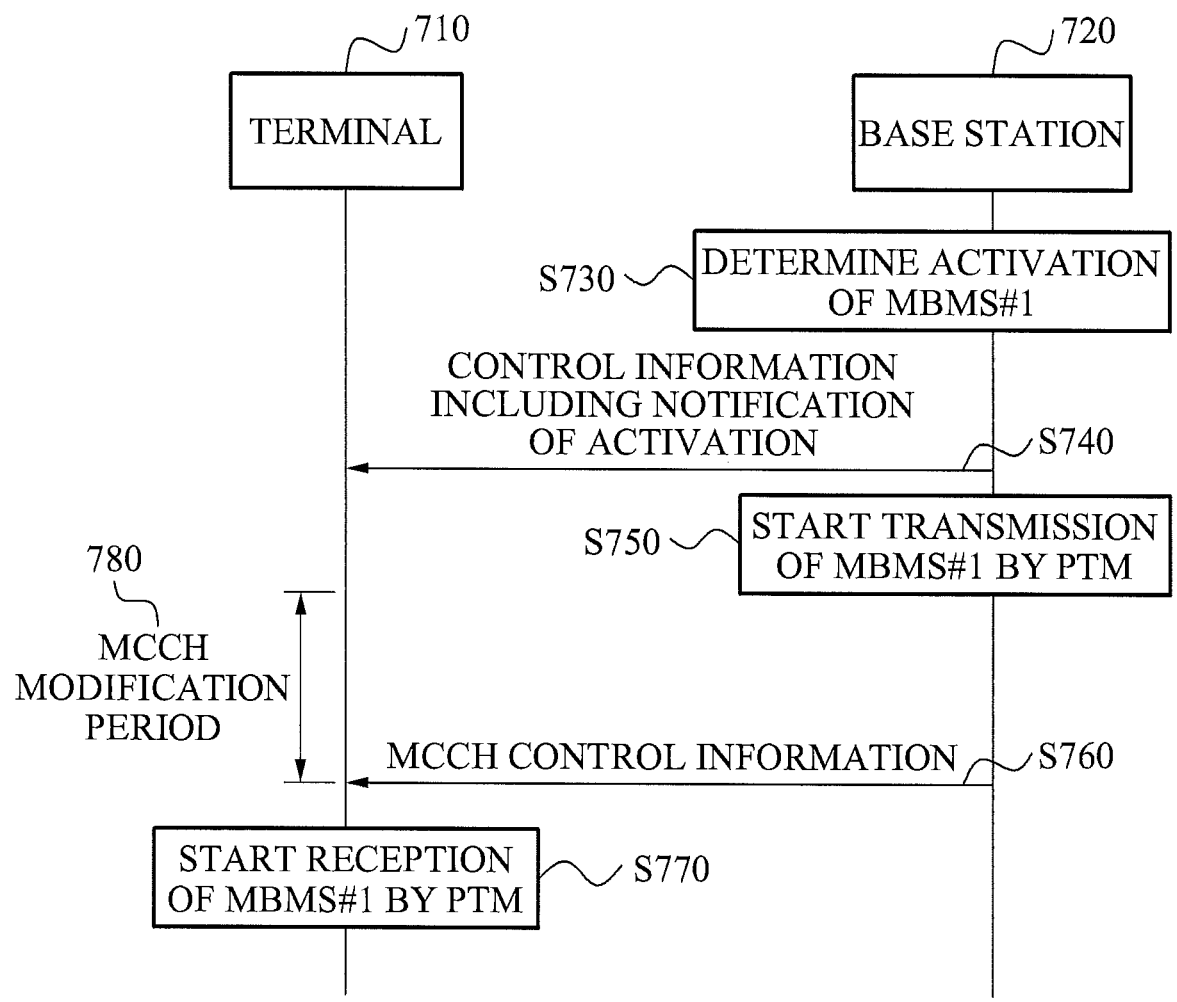
FIG. 7 is a diagram illustrating a process of activating a multimedia service, according to an embodiment of the present invention.

FIG. 7 is a diagram illustrating a process of activating a multimedia service, according to an embodiment of the present invention.

When a base station 720 determines to activate a particular multimedia service using information collected from a terminal 710, the base station 720 may determine activation of the multimedia service in operation S730 and transmit control information informing activation of the multimedia service in operation S740.

According to an aspect, the base station 720 may transmit whether the multimedia service is activated using existing information such as the MCCH control information or MSI, or transmit the corresponding multimedia service using a newly defined message such as RRC, MAC CE, or physical layer control information. Here, the base station 720 may simply notify that the particular multimedia service is activated, thereby inducing the terminal 710 to receive the MBMS related control information. Also, the base station 720 may transmit part of the MBMS related control information. For example, when the base station 720 transmits only an activation notification message, the base station 710 may start the operation from receiving of MBMS system information block (MBMS SIB).

According to another aspect, the base station 720 may induce terminals receiving a PTP multimedia service to receive control information related to the MBSFN and the MBMS. Specifically, the terminal 710 may receive control information related to MBSFN setting of SIB2, SIB13, and the MCCH information. The base station 720 may induce the terminal 710 to receive control information prior receiving the multimedia service or to receive the control information during reception of the multimedia service. That is, the terminal 710 may receive the MBSFN information of SIB2, the MBMS related control information of SIB13, or additionally the MCCH control information, prior to or while receiving the PTP multimedia service or after activation of the multimedia service is determined. When transmitting the MBMS related control information along with a notification message, the base station 720 may transmit a notification message notifying activation of control information such as an MBSFN subframe structure in the MBMS SIB or an MCCH offset, along with the multimedia service, thereby omitting reception of the system information or MCCH notification. While the base station 720 that determined to activate the multimedia service is transmitting the multimedia service data by the PTM and PTP modes, when a predetermined time elapses or when the terminals 710 receiving the multimedia service by PTP change the reception mode to PTM, the base station 720 transmits the data only by the PTM mode.

The terminals 710 receiving the multimedia service by the PTP mode may determine necessity of receiving the MCCH by continuously checking the MCCH control information or the MBMS notification.

When a particular MBMS service is activated in the 3GPP LTE network, the base station 720 may transmit the MCCH control information, control information containing another type of session list, or control information such as the MCH scheduling information to the terminal 710. The base station 720 may add MBMS related control information to the MCCH or session information of the control information containing the session list, notify the activation in the MCCH session information, or indicate an ending position in a subframe of the corresponding service in the MCH scheduling information. Alternatively, the base station 720 may transmit control information notifying activation of the particular multimedia service through newly defined control information. The base station 720 may transmit the control information related to the multimedia service using existing RRC control information or the system information. Also, the base station 720 may define a new control message and transmit the control message to the terminal 710.

When the terminal 710 receives the MBMS related control information form a relay node and receives MBMS service data from another base station, the relay node may receive the SIB2, the SIB13, and additionally the MCCH information from a base station including the terminal 710, using the MBMS related control information. The relay node may provide the MBMS related control information of the contributor base station to the terminal 710. In addition, the relay node may additionally provide the terminal 710 with the SIB2, the SIB13, or the MCCH information. Furthermore, the relay node may provide notification information for notifying change of the MCCH of the contributor base station. For example, in the same manner as other base stations, the relay node may provide, through a PDCCH of the relay node, the MBMS related control information transmitted through a PDCCH of the contributor base station. The relay node may have the same system information changing period or MCCH changing period as the contributor base station. The contributor base station may transmit control information to the relay node such that the relay node use the same setting as the contributor base station.

Figure 8:
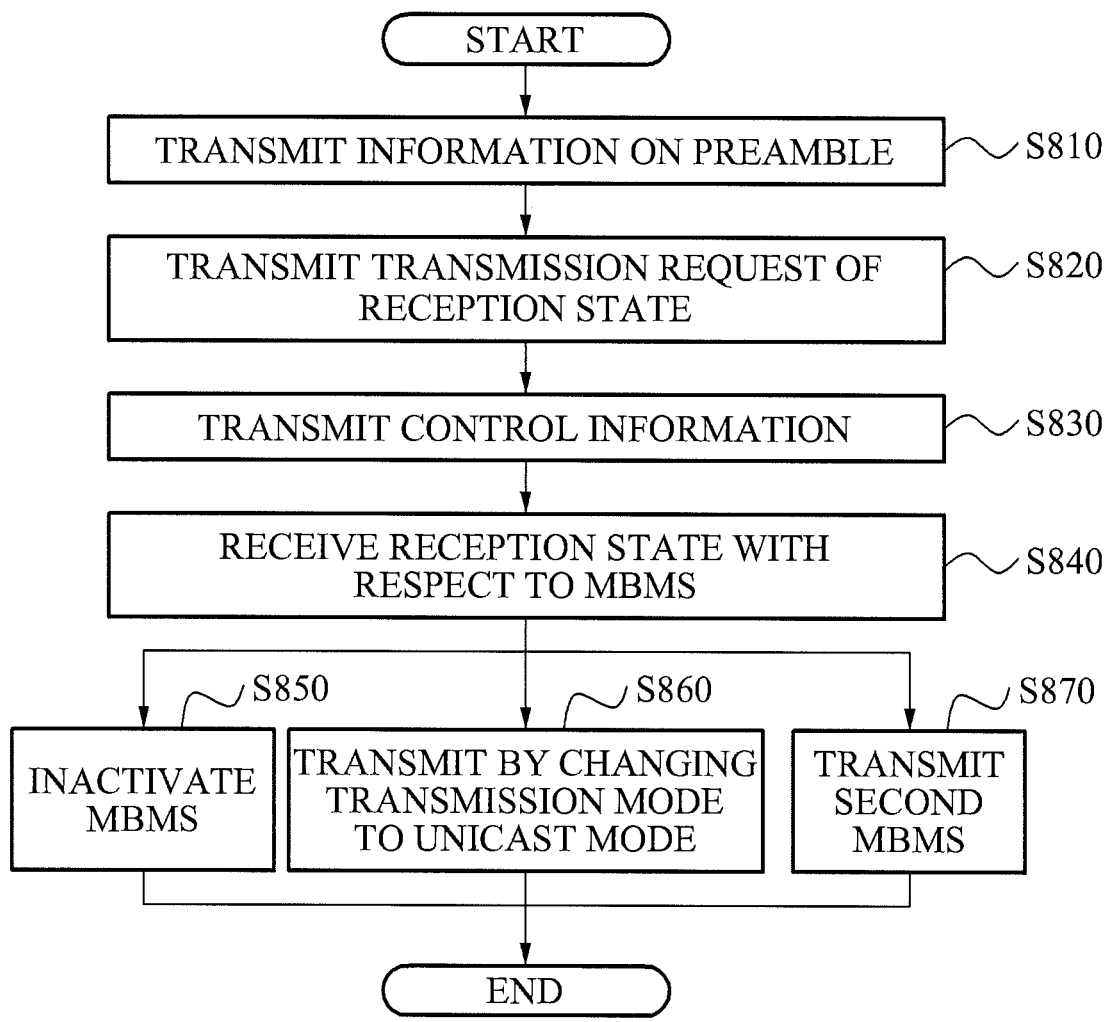
FIG. 8 is a flowchart illustrating stages of an operation method of a network device, according to an embodiment of the present invention.

FIG. 8 is a flowchart illustrating stages of an operation method of a network device, according to an embodiment of the present invention.

In operation S810, the network device may transmit information on a preamble to terminals in coverage of a cell including a base station. The terminals receive MBMS transmitted from the base station. The MBMS refers to a multimedia service provided to the terminals in the coverage of the cell including the base station. The terminals may receive the MBMS service in connection with the network through the base station or out of connection with the network.

In operation S820, the network device transmits a transmission request for a reception state of terminals receiving the MBMS. According to an aspect, the network device may transmit an MBMS transmission request using the MBMS.

In operation S830, the network device transmits control information related to the MBMS to respective terminals. In this case, the terminals may transmit the reception states with respect to the MBMS to the base station based on the control information. The control information may contain information on wireless resource for transmitting the reception state with respect to the MBMS to the base station. In addition, the control information may include at least one of a list of services transmitted by unicast, a list of activated MBMS services among MBMS services provided by the network device, and a list of inactivated MBMS services among MBMS services provided by the network device.

According to an aspect, the network device may transmit the control information only when the control information is changed. When the control information is changed, the network device may inform the respective terminals of the change. In operation S830, the network device may transmit the control information according to the change of each control information.

In operation S840, the network device may receive the reception states with respect to the MBMS of the respective terminals, from at least one terminal receiving the MBMS.

In operation S840, the terminals not connected with the network may transmit the reception states with respect to the MBMS using a random access process. In this case, the respective terminals may perform the random access process using the preamble received in operation S810.

Each of the terminals may transmit, to the network device, an ID for the network device to distinguish the terminal or a terminal group including the terminal along with the MBMS reception state. Based on the ID, the network device may calculate a number of terminals receiving the MBMS, a number of the terminal groups, and a number of base stations transmitting the MBMS.

According to an aspect, in operation S850, the network device may inactivate the MBMS. For example, the network device may compare the number of the terminals receiving the MBMS with a predetermined threshold value. When the number of the terminals is less than the predetermined threshold value, the network may inactivate the MBMS.

According to another aspect, in operation S860, the network device may change a transmission mode of the MBMS to the unicast mode. For example, when the number of the terminals receiving the MBMS is less than the predetermined threshold value or greater than the predetermined threshold value, the network device may change the transmission mode to the unicast mode. In this case, the network device may allocate the same ID to the terminals receiving the MBMS, and provide the multimedia service changed to the unicast mode based on the allocated ID.

According to yet another aspect, in operation S870, the network device may end a first MBMS and transmit a second MBMS. In this case as well, the network device may determine whether to provide the second MBMS based on the number of terminals receiving the first MBMS. In this case, the control information transmitted in operation S830 may include information on a starting point of time of the second MBMS or an ending point of time of the first MBMS. In operation S870, in addition, the network device may provide the second MBMS at the starting point of time of the second MBMS.

Figure 9:
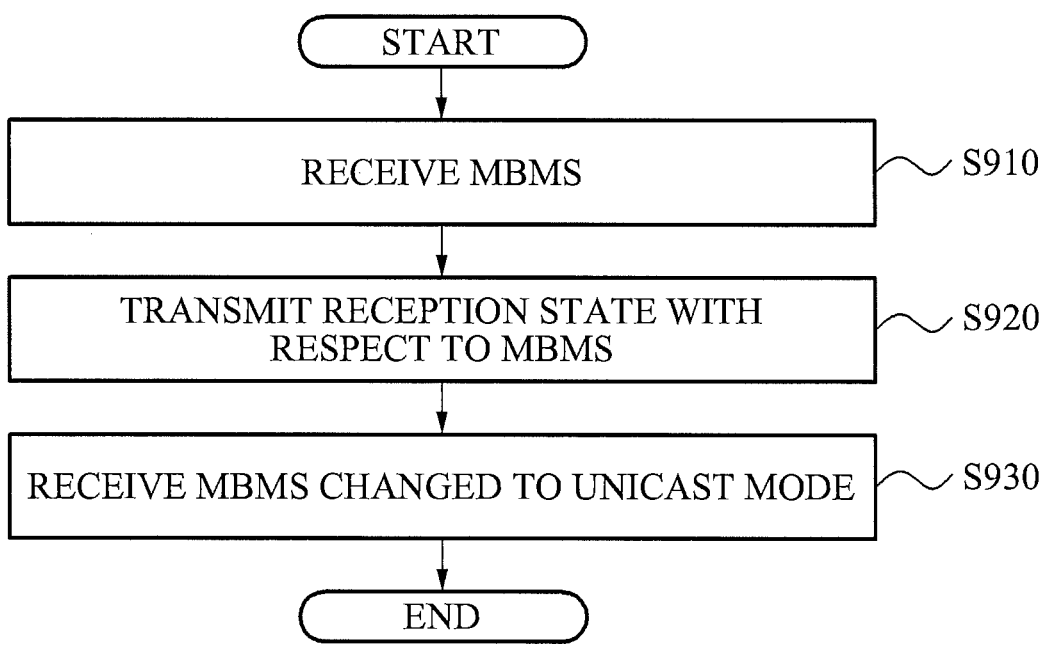
FIG. 9 is a flow chart illustrating stages of an operation method of a terminal, according to an embodiment of the present invention.

FIG. 9 is a flowchart illustrating stages of an operation method of a terminal according to an embodiment of the present invention.

In operation S910, the terminal receives an MBMS from a network device. A base station providing the MBMS may be used as the network device. The terminal may be connected to the network through the base station or not connected to the network.

In operation S920, the terminal may transmit a reception state with respect to the MBMS to the network device. According to an aspect, the terminal may receive a transmission request for the MBMS from the base station, and transmit the reception state to the network device in response to the received transmission request.

When the terminal is not connected to the network, the terminal may transmit the MBMS reception state using a random access process. In this case, the terminal may receive control information related to a preamble and wireless resource from the network device and perform the random access process using the control information. Here, the network device may transmit a particular preamble to a terminal receiving the MBMS to distinguish the MBMS receiving terminal from other terminals.

The MBMS reception state transmitted by the terminal may be used by the network device to determine whether to inactivate the MBMS or change a transmission mode of the MBMS to the unicast mode.

In operation 930, the terminal may receive the MBMS changed to the unicast mode from the network device.

FIG. 10 is a flowchart illustrating stages of an operation method of a terminal, according to another embodiment of the present invention.

In operation S1010, the terminal receives information on a preamble from a network device. The network device may transmit a particular preamble to a terminal receiving an MBMS to distinguish the MBMS receiving terminal from other terminals.

In operation S1020, the terminal may receive the MBMS from the network device.

In operation S1030, the terminal may receive control information from the network device. The control information may include at least one of a list of services transmitted by unicast, a list of activated MBMS services among MBMS services provided by the network device, and a list of inactivated MBMS services among MBMS services provided by the network device.

In operation S1040, the terminal may receive a transmission request for a reception state with respect to MBMS from the network device.

In operation S1050, the terminal may transmit the MBMS reception state to the network device. According to an aspect, the MBMS reception state may be used for the network device to determine whether to inactivate the MBMS or change a transmission mode of the MBMS to the unicast mode. The terminal may transmit the reception state based on the control information received in operation S1030.

The terminal may be in a non-connected state with respect to the network. In this case, the terminal may transmit the MBMS reception state to the network device using a random access process. The terminal may perform the random access using the preamble received in operation S1010.

In operation S1060, the network device may inactivate the MBMS. In this case, the terminal is incapable of receiving the MBMS.

In operation S1070, the network device may transmit the MBMS by changing the transmission mode of the MBMS to the unicast mode. In this case, the terminal may receive the MBMS by unicast.

Example embodiments include computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of computer-readable media include magnetic media such as hard disks, floppy disks, and magnetic tape; optical media such as CD ROM discs; magneto-optical media such as floptical discs; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of providing a first multimedia service, the method comprising:
   transmitting the first multimedia service to one or more terminals by multicast;
   transmitting a request message relating to the first multimedia service to the one or more terminals;
   receiving one or more response messages from the one or more terminals;
   determining a number of terminals receiving or interested to receive the first multimedia service based on the one or more response messages; and
   determining whether to deliver the first multimedia service by multicast based on the number of terminals receiving or interested to receive the first multimedia service,
   wherein the request message includes a first list of multimedia services, and the first list indicates a first set of multimedia services, including the first multimedia service, currently being provided by multicast, a second set of multimedia services currently being provided by unicast, and a third set of multimedia services currently not being provided.

2. The method of claim 1, wherein transmitting the first multimedia service to one or more terminals by multicast is accomplished through a Multicast Broadcast Single Frequency Network (MBSFN) channel.

3. The method of claim 1, wherein the request message is transmitted through a Multicast Control Channel (MCCH).

4. The method of claim 1, wherein at least one of the one or more response messages comprises a second list of multimedia services, and the second list indicates a fourth set of multimedia services, including the first multimedia service, currently being provided by multicast, a fifth set of multimedia services currently being provided by unicast, and a sixth set of services currently not being provided.

5. A method of receiving a first multimedia service by a terminal, the method comprising:
   receiving the first multimedia service from a base station by multicast;
   receiving a request message relating to the first multimedia service from the base station;
   generating a response message, wherein the response message indicates that the terminal is receiving or interested to receive the first multimedia service;
   transmitting the response message to the base station in response to the request message,
   wherein the request message includes a first list of multimedia services, and the first list indicates a first set of multimedia services, including the first multimedia service, currently being provided by multicast, a second set of multimedia services currently being provided by unicast, and a third set of multimedia services currently not being provided.

6. The method of claim 5, wherein receiving the first multimedia service by multicast is accomplished through a Multicast Broadcast Single Frequency Network (MBSFN) channel.

7. The method of claim 5, wherein the first multimedia service is received from the base station by multicast in response to a threshold number of terminals including the terminal indicating as receiving or interested to receive the first multimedia service.

8. The method of claim 5, wherein the response message comprises a second list of multimedia services, and the second list indicates a fourth set of multimedia services, including the first multimedia service, currently being provided by multicast, a fifth set of multimedia services currently being provided by unicast, and a sixth set of services currently not being provided.

9. A communication apparatus to provide a first multimedia service, the communication apparatus comprising:
   a circuitry configured to:
      cause the communication apparatus to transmit the first multimedia service to one or more terminals by multicast;
      cause the communication apparatus to transmit a request message relating to the first multimedia service to one or more terminals;
      cause the communication apparatus to receive one or more response messages from the one or more terminals;
      determine a number of terminals receiving or interested to receive the first multimedia service based on the one or more response messages; and
   determine whether to deliver the first multimedia service by multicast based on the number of terminals receiving or interested to receive the first multimedia service,
   wherein the request message includes a first list of multimedia services, and the first list indicates a first set of multimedia services, including the first multimedia service, currently being provided by multicast, a second set of multimedia services currently being provided by unicast, and a third set of multimedia services currently not being provided.

10. The apparatus of claim 9, wherein transmitting the first multimedia service to one or more terminals by multicast is accomplished through a Multicast Broadcast Single Frequency Network (MBSFN) channel.

11. The communication apparatus of claim 9, wherein at least one of the one or more response messages comprises a second list of multimedia services, and the second list indicates a fourth set of multimedia services, including the first multimedia service, currently being provided by multicast, a fifth set of multimedia services currently being provided by unicast, and a sixth set of services currently not being provided.

12. A terminal to receive a first multimedia service, the terminal comprising:
a circuitry configured to:
cause the terminal to receive the first multimedia service from a based station by multicast;
cause the terminal to receive a request message relating to the first multimedia service from the base station;
cause the terminal to generate a response message, wherein the response message indicates that the terminal is receiving or interested to receive the first multimedia service; and
cause the terminal to transmit the response message to the base station in response to the request message,
wherein the request message includes a first list of multimedia services, and the first list indicates a first set of multimedia services, including the first multimedia service, currently being provided by multicast, a second set of multimedia services currently being provided by unicast, and a third set of multimedia services currently not being provided.

13. The terminal of claim 12, wherein receiving the first multimedia service by multicast is accomplished through a Multicast Broadcast Single Frequency Network (MBSFN) channel.

14. The terminal of claim 12, wherein the circuitry is configured to cause the terminal to receive the first multimedia service from the base station by multicast in response to a threshold number of terminals including the terminal indicating as receiving or interested to receive the first multimedia service.

15. The terminal of claim 12, wherein the response message comprises a second list of multimedia services, and the second list indicates a fourth set of multimedia services, including the first multimedia service, currently being provided by multicast, a fifth set of multimedia services currently being provided by unicast, and a sixth set of services currently not being provided.

16. A communication device for a terminal, the communication device comprising:
a circuitry configured to:
cause the terminal to receive the first multimedia service from a base station by multicast;
cause the terminal to receive a request message relating to a first multimedia service from the base station;
cause the terminal to generate a response message, wherein the response message indicates that the terminal is receiving or interested to receive the first multimedia service; and
cause the terminal to transmit the response message to the base station in response to the request message,
wherein the request message includes a first list of multimedia services, and the first list indicates a first set of multimedia services, including the first multimedia service, currently being provided by multicast, a second set of multimedia services currently being provided by unicast, and a third set of multimedia services currently not being provided.

17. The communication device of claim 16, wherein receiving the first multimedia service by multicast is accomplished through a Multicast Broadcast Single Frequency Network (MBSFN) channel.

18. The communication device of claim 16, wherein the response message comprises a second list of multimedia services, and the second list indicates a fourth set of multimedia services, including the first multimedia service, currently being provided by multicast, a fifth set of multimedia services currently being provided by unicast, and a sixth set of services currently not being provided.

19. A method of receiving a first multimedia service by a terminal, the method comprising:
receiving the first multimedia service from a base station;
receiving a request message relating to the first multimedia service from the base station;
generating a response message, wherein the response message indicates that the terminal is receiving is receiving or interested to receive the first multimedia service;
transmitting the response message to the base station in response to the request message,
wherein the request message includes a first list of multimedia services, and the first list indicates a first set of multicast multimedia services, including the first multimedia service, currently being provided, a second set of unicast multimedia services currently being provided, and a third set of multimedia services currently not being provided.

20. The method of claim 19, wherein receiving the first multimedia service from the base station is accomplished through a Multicast Broadcast Single Frequency Network (MBSFN) channel.

21. The method of claim 19, wherein the request message is received through a Multicast Control Channel (MCCH).

22. The method of claim 19, wherein the response message comprises a second list of multimedia services, and the second list indicates a fourth set of multicast multimedia services, including the first multimedia service, currently being provided, a fifth set of unicast multimedia services currently being provided, and a sixth set of services currently not being provided.

* * * * *